Patented Nov. 11, 1947

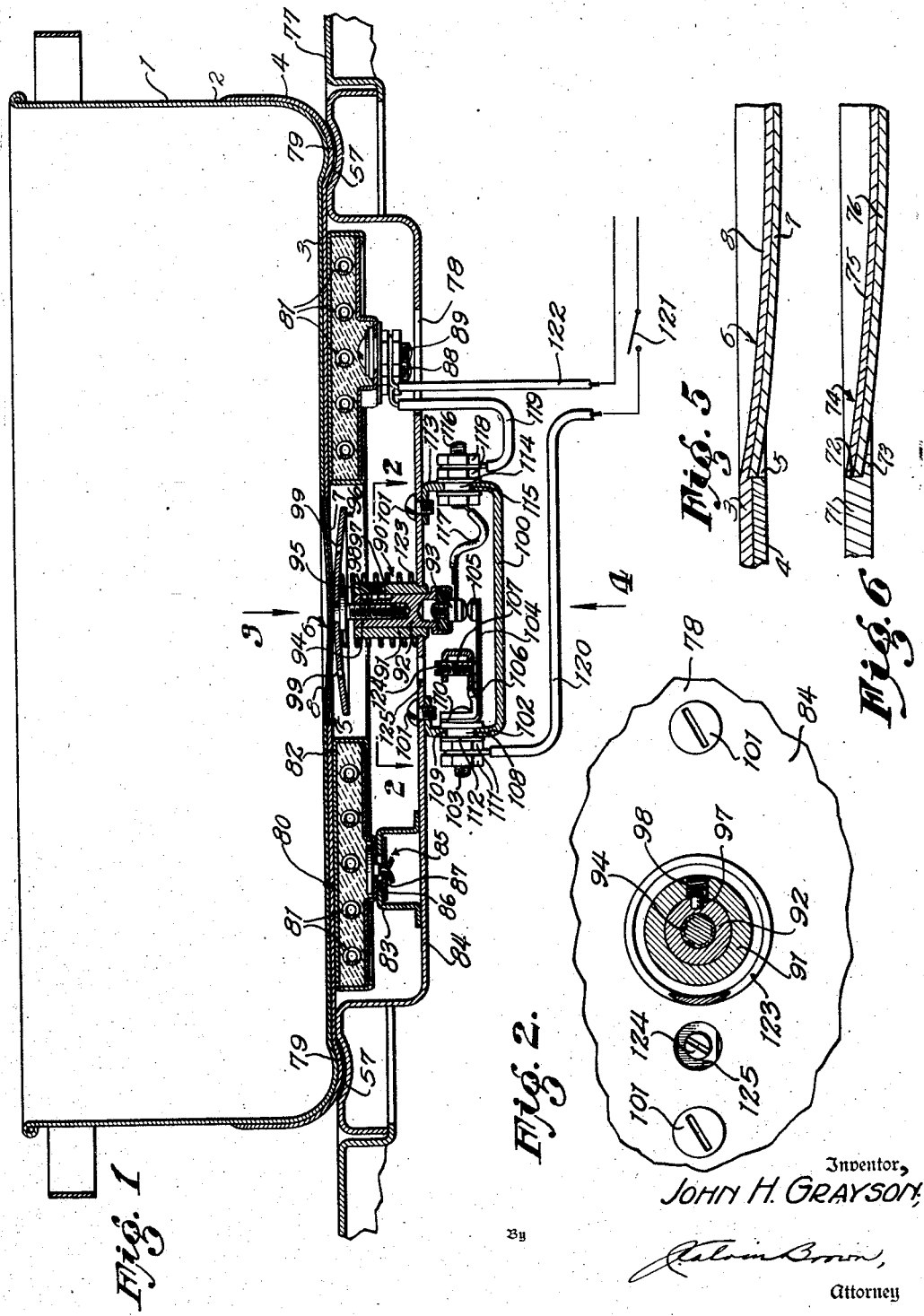

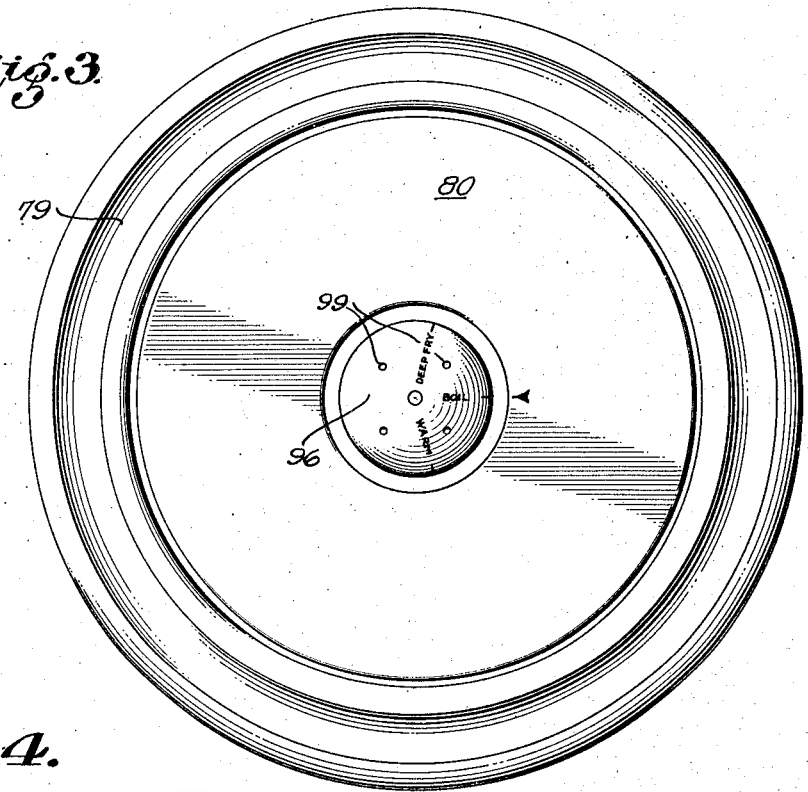
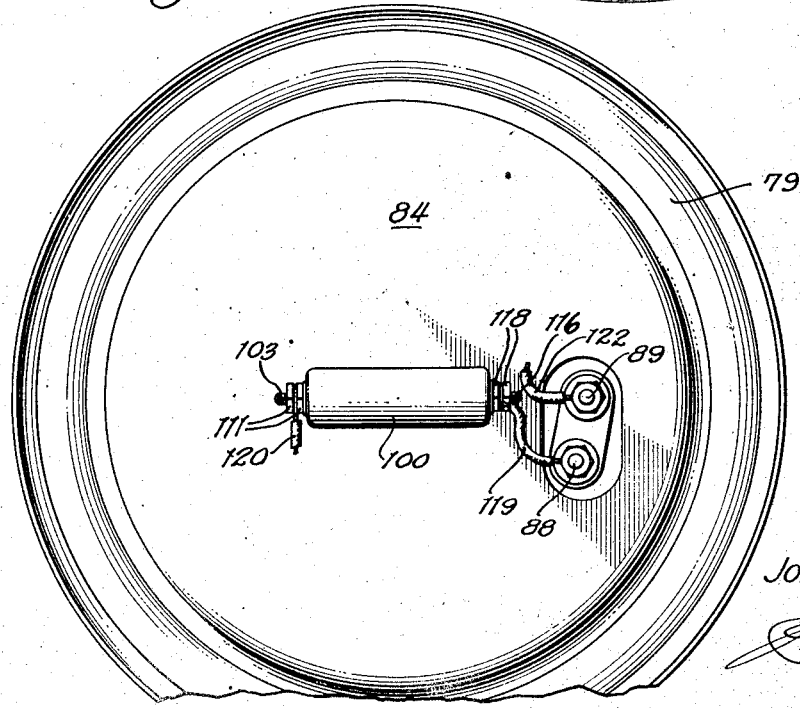

2,430,715

UNITED STATES PATENT OFFICE 2,430,715

ELECTRIC HEATER FOR COOKING UTENSILS

John H. Grayson, Monrovia, Calif., assignor to Lowell and Grayson Manufacturing Company, Monrovia, Calif., a corporation of California Original application June 8, 1942, Serial No. 446,203. Divided and this application October 17, 1945, Serial No. 622,887

7 Claims. (Cl. 219—43)

This application is a division of my copending application, Serial No. 446,203, filed June 8, 1942, which resulted in Patent No. 2,402,997, issued July 2, 1946.

The invention relates to cooking apparatus, and is more particularly concerned with a novel electric heater especially designed and adapted for use with the novel type of cooking utensil disclosed and claimed in the parent application which is so formed and constructed in relation to the heater as to regulate to a predetermined degree the delivery of heat from the heater to said utensil.

Heretofore cooking utensils were ordinarily heated on a range, either gas or electric, and the housewife regulated the heating as desired, with the result that in many instances the cooking utensil became too hot and the contents boiled over or cooked away despite the vigilance of the housewife, and in many instances foods which required cooking at a predetermined temperature were spoiled because of the difficulty of closely approximating that temperature with the available controls and by mere observation of the food during the cooking thereof. It is, therefore, the principal object of the present invention to provide a heater designed for use with the novel thermostatic type of cooking utensil disclosed in the parent application and including control means operable by said utensil, so that the contents of the utensil may be heated up to a predetermined temperature, and when that temperature is reached the heater is thereafter regulated thermostatically automatically by the utensil so as to prevent any excessive variation in the temperature from that predetermined.

In accordance with my invention, I have provided a novel form of cooking utensil, such as a pan, having a bimetallic thermostat built into the bottom thereof and arranged to cooperate with a switch in the electric heater, so that movement of the thermostat results in a corresponding movement of the switch to control the operation of the heater as desired. The heater is so constructed in relation to the utensil for convenient centralization of the thermostat with the actuator.

The invention is illustrated in the accompanying drawings, in which—

Fig. 1 is a vertical section through an electric heater made in accordance with my invention, showing the novel type of utensil for actuating the switch thereof resting thereon.

Fig. 2 is an enlarged sectional detail on the line 2—2 of Fig. 1.

Fig. 3 is a plan view of the heater, as indicated by the arrow 3 in Fig. 1.

Fig. 4 is a bottom view of the heater, and

Figs. 5 and 6 are fragmentary enlarged sectional details of different forms of bimetallic heat responsive portions for the cooking utensil.

The same reference numerals are applied to corresponding parts throughout these views.

Referring to the drawings, I have illustrated at 1 a cooking utensil, such as a pan, the same including a side wall 2 and bottom 3. This utensil, for convenience of description only, is assumed to have been constructed of stainless steel and provided with a copper clad bottom, as indicated at 4. Stainless steel and copper have substantially the same temperature coefficient of expansion. I have removed an area of the copper clad portion substantially centrally of the bottom of the pan, as indicated at 5, and I have reduced the thickness of the relatively highly expansive stainless steel of the pan bottom 3 at this portion, as shown in Fig. 5, to provide a movable or distortable heat responsive portion 6. To the heat responsive portion 6, I have bonded, in any approved manner, a relatively lowly expansive disc 7, this disc having a negligible coefficient of expansion as compared to the relatively high coefficient of expansion of the portion 6. For instance, the disc 7 is preferably made of 36% nickel steel, although that particular percentage may be varied or another metal suitable for the purpose may be used, but it is preferable for the temperature to which it is subject. The bonded metals 6—7 are concavo-convex in form and together form a bimetallic couple or thermostat 8 of the graduating type as part of the bottom of the pan or utensil 1. The convex surface of the thermostat is normally presented externally of the bottom of the utensil as shown in Figs. 1 and 5. It is evident that if heat is applied to the bottom of the utensil, there will be a difference in the rate of expansion between the portions 6 and 7 with the result that as the temperature of the utensil is raised, the thermostat 8 will tend to straighten or become coplanar with the bottom 3 of the utensil. This thermostat 8 is adapted to actuate means for controlling the operation of the heating means, in this case a switch for controlling electric current flow to the heating coils of an electric heater while said heater is in operation under the utensil 1 on which the thermostat is provided. The reference numeral 77 designates an electric stove or range casing in which the electric heater and switch mechanism are provided, as hereinafter more specifically described.

The cooking top 77 has an opening in which a depressed supporting ledge is provided to carry the heater support 78. This support is formed with one or more annular grooves 79 to receive the projecting annular bead portions 57 provided on the bottom 3—4 of the utensil to center said utensil with respect to the switch actuator 96. The electric heater is indicated generally by the reference numeral 80 and comprises "calrods" 81 which are arranged in spiral form and supported in any suitable manner in annular casing 82. The calrods may be exposed in the usual manner, or may be surrounded by fire clay, as indicated in the drawing. The casing 82 is supported at spaced points by U-shaped brackets 83 welded or otherwise suitably secured to the bottom wall 84 of the support 78. I have shown the annular casing 82 held on the supports 83 at 85 by passing a pair of wires secured to the bottom of the casing 82 through an opening 86 in the support and through a registering opening in a washer 87, the projecting ends of the wires being bent in diverging relation, like the ends of a cotter pin. The ends of the calrod 81 are attached to the terminal posts 88 and 89 appearing in Fig. 4. A plunger means, designated generally by the numeral 90 in Fig. 1, is mounted centrally on the support 78 and serves to make and break the electric circuit for the calrod units of the burner. The plunger means includes a guide bushing 91 suitably secured to the bottom wall 84 of the support 78 and a plunger 92 reciprocable in said bushing. One end of the plunger 92 carries a switch contact 93. The other end has a threaded bore 94 adjustably receiving a screw 95 carrying the switch actuator disc 96. The latter is of convexo-concave form and adjustable as to height relative to the plunger 92 by turning the same to thread the screw 95 one way or the other in the bore 94. The plunger 92 is held against turning in the adjustment of the screw 95 by the engagement in a keyway 97 in the plunger of a pin 98 threaded in the bushing 91. The actuator disc 96, as shown in Fig. 3, has spaced-apart holes 99 adapted to receive the ends of a spanner wrench or other means for adjusting the disc, and the top convex face of the disc bears suitable legends "deep fry," "boil," and "warm" which will serve to indicate to the housewife the adjustment of the disc, there being a suitable index mark on the top of the casing of the heater 80 relative to which the disc is turned, as clearly appears in Fig. 3.

The switch contact 93 is enclosed in a casing 100 depending from the bottom wall 84 of the support 78 and attached thereto by screws 101. One end wall 102 of this casing has a hole 109 through which an insulation grommet 108 extends for insulation of a terminal screw 103. This screw supports a leaf spring arm 104 carrying a switch contact 105, and also supports a bracket 106 carrying an adjusting screw 107 engaging the spring arm 104 for a purpose which will later appear. The insulation grommet 108 maintains the bent end 110 of the spring arm 104 in insulated relation to the casing 100. The usual terminal nuts 111 are threaded on the screw 103 and serve to clamp screw and grommet in place, an insulation washer 112 being inserted behind one of the nuts so as to insulate the conductor 120 which is attached to the terminal screw 103. The other end 113 of the casing 100 carries another insulation grommet 114 fitting in a hole 115 to insulate another terminal screw 116 from the casing. This screw carries a flexible electrical connection 117 attached to the switch contact 93. This screw also has nuts 118 threaded thereon for attaching one end of the conductor 119, the other end of which is attached to the terminal post 88. A switch 121 serves to connect conductors at 122 with a source of electric current supply, the conductor 122 being connected to terminal post 89.

The actuator disc 96 and plunger 92 are normally urged upwardly by a coiled compression spring 123 which surrounds the bushing 91 and rests on the bottom wall 84 of the support 78. In that way, the contacts 93 and 105 are normally separated. The normal distance between these contacts may be varied by adjustment of the screw 107, said screw having a slot to receive a screw driver for such adjustment and there being an opening 125 in the support 78 to permit entering the screw driver for the adjustment. The utensil 1 and the actuator disc 96 must be removed when this adjustment is made.

In passing, attention is called to Fig. 6, in which I have shown that the cooking utensil may be provided with a different kind of thermostat 74, the utensil bottom 71 being provided with a central flanged opening 72 for support of the two metal discs 75 and 76 having different thermal characteristics. This thermostat 74 is concavo-convex normally, the same as the thermostat 8, and tends to straighten or flatten as it becomes heated. Any convenient method may be used for fastening the thermostat 74 to the bottom 71 to make a fluid-tight seal at 72—73.

The operation, uses and advantages of the invention are as follows:

To begin with, it is assumed that the utensil 1 contains some food product and that it is desired to heat this food to the boiling point. Accordingly, the actuator disc 96, prior to placing the utensil 1 on the heater, is turned to the position shown with the legend "boil" adjacent the index mark. The utensil is then placed on the heater and is centered easily by engagement of the bead 57 in the groove 79, so that the bimetallic thermostat 8 is in register with the switch actuator disc 96. Normally the convexity of the thermostat 8 is somewhat greater than that illustrated in Fig. 1 and substantially like that shown in Figs. 5 and 6. In any event, the thermostat 8 depresses the actuator disc 96, thereby closing the contacts 93 and 105. Now, assuming the switch 121 has been closed, electric current flows through the calrods 81 to apply heat to the utensil. The heat path is upwardly from the calrods 81 through the bottom 3—4 of the utensil and laterally and downwardly through the contents of the utensil to the thermostat 8 or 74, as the case may be. As this thermostat becomes heated, the inner member 6 or 75 having a higher rate of expansion than the outer one 7 or 76, the heat of the food will directly affect that portion of the thermostat subject to the greatest expansion, while the other portion which has the least thermal expansion is more or less shielded from the heat of the calrods 81 by the interfering ring of fire clay and the annular inner wall of the casing 82 of the heater 80, and the thermostat will accordingly tend to straighten and will allow the actuator disc 96 and plunger 92 to rise under action of the spring 123. Ultimately, when the food reaches the boiling point, the thermostat 8 or 74, as the case may be, becomes substantially flat, the circuit is broken at 93—105 for the electric heater 80. The food in the utensil, being no longer heated, cools and as soon as the thermostat responds to this cooling by bulging downwardly toward its normal convexo-concave form, the switch actuator disc 96 is depressed again to close the contacts 93 and 105 and the cycle previously described is repeated, so that the food will be kept at or near the boiling point as long as the housewife desires, and without requiring any attention during the operation.

It is believed the foregoing description conveys a good understanding of the objects and advantages of my invention. The appended claims have been drawn to cover all legitimate modifications and adaptations.

I claim:

1. In combination, an electrical heating element adapted for heating a cooking utensil and a utensil support associated therewith, a control switch for said heating element having a movable operating element extending therefrom to the utensil support for operation, and a cooking utensil adapted to be supported removably on the utensil support having a thermostat forming a part of one wall thereof substantially flush with adjacent portions of said wall and detachably engageable with the movable operating element of said control switch and freely movable laterally with respect thereto into and out of operative relation thereto while it is always in intimate contact on the inner side thereof with the contents of said utensil and directly responsive to changes in temperature thereof and is removable from the utensil support with the utensil and cleanable therewith, said thermostat being movable in response to temperature changes for direct operation of the operating element of the control switch when the utensil rests on the utensil support for heating of its contents.

2. A structure as set forth in claim 1, wherein the thermostat comprises a bimetallic disc portion in the bottom wall of the utensil, the central portion of which is adapted to move in the distortion of the thermostat when heated, the operating element for the control switch being movable by engagement with the central portion of said bimetallic thermostat.

3. A structure as set forth in claim 1, wherein the thermostat comprises a bimetallic disc portion in the bottom wall of the utensil, the central portion of which is adapted to move in the distortion of the thermostat when heated, the operating element for the control switch being movable by engagement with the central portion of said bimetallic thermostat, the structure further including an actuator threadedly adjustable on the end of the operating element of the control switch and rotatable for temperature adjustments relative to said operating element and relative to a stationary index mark on the heating element, said actuator being uncovered and accessible for manipulation when the utensil is removed.

4. A structure as set forth in claim 1, wherein the thermostat comprises a bimetallic disc portion in the bottom wall of the utensil, the central portion of which is adapted to move in the distortion of the thermostat when heated, the operating element for the control switch being movable by engagement with the central portion of said bimetallic thermostat, the structure further including an actuator threadedly adjustable on the end of the operating element of the control switch and rotatable for temperature adjustments relative to said operating element and relative to a stationary index mark on the heating element, said actuator being uncovered and accessible for manipulation when the utensil is removed, and an enclosing ring in the middle of the heating element surrounding the actuator and arranged to engage the bottom of the utensil around the bimetallic thermostat to shield said thermostat and actuator for extraneous heat.

5. A structure as set forth in claim 1, wherein said control switch comprises a contact carried by said movable operating element, and a second contact on a support relative to which said operating element moves, said second contact being arranged to be engaged by and moved with said first contact to complete an electrical circuit through said heating element, spring means for returning said second contact, and adjustable means for limiting the return movement.

6. A structure as set forth in claim 1, wherein said control switch comprises a contact carried by said movable operating element, a support relative to which said movable operating element moves, and a leaf spring mounted on said support and carrying a second contact arranged to be engaged by and moved with said first contact in the movement of the operating element to complete an electrical circuit through said heating element.

7. A structure as set forth in claim 1, wherein said control switch comprises a contact carried by said movable operating element, a support relative to which said movable operating element moves, a leaf spring mounted on said support and carrying a second contact arranged to be engaged by and moved with said first contact in the movement of the operating element to complete an electrical circuit through said heating element, and an adjustable screw on said support for limiting the return movement of said leaf spring.

JOHN H. GRAYSON.

REFERENCES CITED

The following references are of record in the file of this patent:

UNITED STATES PATENTS

| Number | Name | Date |
| --- | --- | --- |
| 2,209,832 | Schurig | July 30, 1940 |
| 2,233,485 | Park | Mar. 4, 1941 |
| 1,678,885 | Thomas | July 31, 1928 |
| 1,025,576 | Kirkwood | May 7, 1912 |
| 2,244,580 | Smith | June 3, 1941 |
| 2,189,127 | Brannon | Feb. 6, 1940 |